United States Patent
Dekeyser

(10) Patent No.: US 6,892,389 B1
(45) Date of Patent: May 10, 2005

(54) BROADCASTING UNIT TO BROADCAST DISTRIBUTIVE INTERACTIVE SERVICES IN AN ACCESS NETWORK

(75) Inventor: Miek Dekeyser, Rumst (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/517,691

(22) Filed: Mar. 2, 2000

(30) Foreign Application Priority Data

Mar. 31, 1999 (EP) .......................................... 99400792

(51) Int. Cl.[7] .............................................. H04N 7/173
(52) U.S. Cl. .......................... 725/120; 725/97; 725/95; 725/93; 725/114; 725/116
(58) Field of Search .............................. 725/48, 86, 91, 725/93–97, 114, 116, 120, 112

(56) References Cited

U.S. PATENT DOCUMENTS

| | | | | |
|---|---|---|---|---|
| 5,280,630 A | * | 1/1994 | Wang ....................... | 455/452.2 |
| 5,513,180 A | * | 4/1996 | Miyake et al. .............. | 370/352 |
| 5,557,316 A | | 9/1996 | Hoarty et al. | |
| 5,812,928 A | * | 9/1998 | Watson et al. .............. | 725/118 |
| 5,883,661 A | * | 3/1999 | Hoarty ........................ | 725/93 |
| 5,886,995 A | * | 3/1999 | Arsenault et al. ........... | 370/477 |
| 5,940,738 A | * | 8/1999 | Rao ............................ | 455/4.2 |
| 5,973,722 A | * | 10/1999 | Wakai et al. ................. | 348/8 |
| 6,212,389 B1 | * | 4/2001 | Fapojuwo ................... | 455/453 |
| 6,266,813 B1 | * | 7/2001 | Ihara .......................... | 725/36 |
| 6,266,816 B1 | * | 7/2001 | Watson et al. .............. | 725/120 |
| 6,272,128 B1 | * | 8/2001 | Pierson, Jr. ................. | 370/352 |
| 6,272,151 B1 | * | 8/2001 | Gupta et al. ................ | 370/489 |
| 6,378,130 B1 | * | 4/2002 | Adams ....................... | 725/95 |
| 6,378,131 B2 | * | 4/2002 | Cunningham et al. ...... | 725/120 |
| 6,385,454 B1 | * | 5/2002 | Bahl et al. .................. | 455/450 |
| 6,401,243 B1 | * | 6/2002 | Suzuki ....................... | 725/86 |
| 6,408,436 B1 | * | 6/2002 | de Haas ..................... | 725/86 |
| 6,453,473 B1 | * | 9/2002 | Watson, Jr. ................. | 725/120 |
| 6,484,317 B1 | * | 11/2002 | Wright ....................... | 725/32 |
| 6,487,390 B1 | * | 11/2002 | Virine et al. ................ | 455/3.01 |
| 6,487,719 B1 | * | 11/2002 | Itoh et al. ................... | 725/17 |
| 6,510,157 B2 | * | 1/2003 | Kwok et al. ................ | 370/395.2 |
| 6,542,489 B1 | * | 4/2003 | Kari et al. ................... | 370/338 |
| 6,594,826 B1 | * | 7/2003 | Rao et al. ................... | 725/95 |
| 6,598,231 B1 | * | 7/2003 | Basawapatna et al. ...... | 725/120 |

OTHER PUBLICATIONS

Tak–Shing P Yum (IEEE Transactions on Communications, vol. 39, No. 8, Aug. 1, 1991).*
Tak–Shing, P Yum: "Hierarchical Distribution of Video with Dynamic Port Allocation" IEEE Transactions on Communicaiton, vol. 39, No. 8, Aug. 1, 1991, pp. 1268–1274, XP000264287 ISSN: 0090–6778.
Bernabei F et al.: "MPEG over ATM Issues: A Scenario Overview" Proceedings of the SPIE, vol. 2451, Mar. 20, 1995, pp. 297–309, XP000607757.
Huang S J: "MPEG Digital Storage Media (DSM) Control Command" Signal Processing. Image Communication, vol. 6, No. 6, Feb. 1, 1995, pp. 521–524, XP000491858 ISSN: 0923–5965.

* cited by examiner

*Primary Examiner*—John Miller
(74) *Attorney, Agent, or Firm*—Sughrue Mion, PLLC

(57) ABSTRACT

In an access network (ACCESS NETWORK) wherein channels (TV1, TV2) of a distributive interactive service are broadcasted, the user terminals (UT1, UT2, UT3) send first type request information to a broadcasting unit (BCU2), close to the subscribers, to indicate the requested channels (TV1, TV6). In case one of the requested channels (TV6) is not available at the input of this broadcasting unit (BCU2), the latter broadcasting unit (BCU2) generates second type request information indicative for the unavailable requested channel (TV6) and sends this second type request information to a more central broadcasting unit (BCU1). Thus, a broadcasting unit (BCU2) close to the subscribers upon request of one of the subscribers either broadcasts a requested channel (TV1) to the subscribers or requests a more central broadcasting unit (BCU1) to be provided with the requested channel (TV6).

8 Claims, 3 Drawing Sheets

BROADCASTING UNIT TO BROADCAST DISTRIBUTIVE INTERACTIVE SERVICES IN AN ACCESS NETWORK

BACKGROUND OF THE INVENTION

The present invention relates to a broadcasting unit for broadcasting in an access network channels of a distributive interactive service to a plurality of user terminals and an access network including such broadcasting units.

Such a broadcasting unit and access network are already known in the art, e.g. from the U.S. Pat. No. 5,557,316, entitled 'System for Distributing Broadcast Television Services Identically on a First Bandwidth Portion of a Plurality of Express Trunks and Interactive Services Over a Second Bandwidth Portion of Each Express Trunk on a Subscriber Demand Basis'. Therein, an interactive television information system is described wherein each broadcasting unit, named headend in the cited US Patent, broadcasts fixed television channels via a first bandwidth portion and broadcasts selected television channels in response to subscriber requests via a second bandwidth portion. The television channels selected in response to subscriber requests and broadcasted via the second bandwidth portion are selected amongst all television channels supplied to an input of the headend or broadcasting unit. A drawback of the known interactive television information system is that all television channels have to be supplied to inputs of all broadcasting units in the access network. Even if none of the subscribers served by a broadcasting unit request a certain television channel, this channel will be available at the input of this broadcasting unit. Consequently, a significant amount of the transfer capacity of the links in the known access network is inefficiently used to transfer television channel information that is not requested by the subscribers to the broadcasting units that serve these subscribers.

SUMMARY OF THE INVENTION

An object of the present invention is to provide a broadcasting unit and access network similar to the known one, but which allow to more efficiently use the transfer capacity of links in the access network.

According to the invention, this object is achieved by a broadcasting unit including a channel selector adapted to select amongst available channels at an input of said broadcasting unit the channels to be broadcasted; a channel broadcaster, coupled to said channel selector, and adapted to broadcast said channels to said user terminals; a request receiver, adapted to receive from one of said user terminals first type request information indicative for at least one requested channel; and a request handler, coupled between said request receiver and a control input of said channel selector, and adapted to interpret said first type request information and to control said channel selector to select said at least one requested channel, wherein the request handler further is adapted to check whether said at least one requested channel is available at said input of said broadcasting unit and wherein said broadcasting unit further comprises: a request generator, coupled to said request handler and adapted to generate in case said at least one requested channel is not available at said input of said broadcasting unit second type request information indicative for said unavailable requested channel; and a request transmitter, coupled to said request generator and adapted to transmit said second type request information to another broadcasting unit.

The invention is also directed to an access network including a plurality of such broadcasting units arranged in a multi-level topology.

Indeed, broadcasting units according to the present invention can be arranged in a multi-level topology. A central broadcasting unit receives all television channels at its input and may be connected to second level broadcasting units via links that can carry a limited number of television channels. The second level broadcasting units are located closer to the subscribers and are of the type defined above. Upon request of one of the subscribers, a second level broadcasting unit either broadcasts a television channel if it is available at its input or requests the central broadcasting unit to be provided with the requested television channel. Summarising, according to the present invention, a multi-level topology of broadcasting units wherein not all television channels are permanently supplied to all broadcasting units in the access network, reduces the access network resource occupancy significantly without affecting the quality of service vis-à-vis the subscribers.

Moreover, since the access network does not need the capability to transfer all television channels that are offered to a subscriber to the broadcasting unit that serves this subscriber, the number of television channels that can be offered to a subscriber in systems wherein the present invention is implemented is higher than in the prior art system.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional feature of the broadcasting unit according to the present invention is that the request generator is adapted to generate said second type request information in accordance with a standard zapping protocol already used for said first type request information.

In this way, when using a standard zapping protocol for second type request information sent from a broadcasting unit close to the subscribers to a more central broadcasting unit, the central broadcasting unit can be implemented by a known broadcasting unit, such as the ones described for instance in the already mentioned U.S. Pat. No. 5,557,316.

An alternative additional feature of the broadcasting unit according to the present invention is that request generator is adapted to generate said second type request information in accordance with a standard signalling protocol.

In this way, when using a standard signalling protocol for second type request information sent from a broadcasting unit close to the subscribers to a central broadcasting unit, the central broadcasting unit can be implemented by a known broadband switching node. Such a broadband switching node is capable of interpreting the standard signalling protocol.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
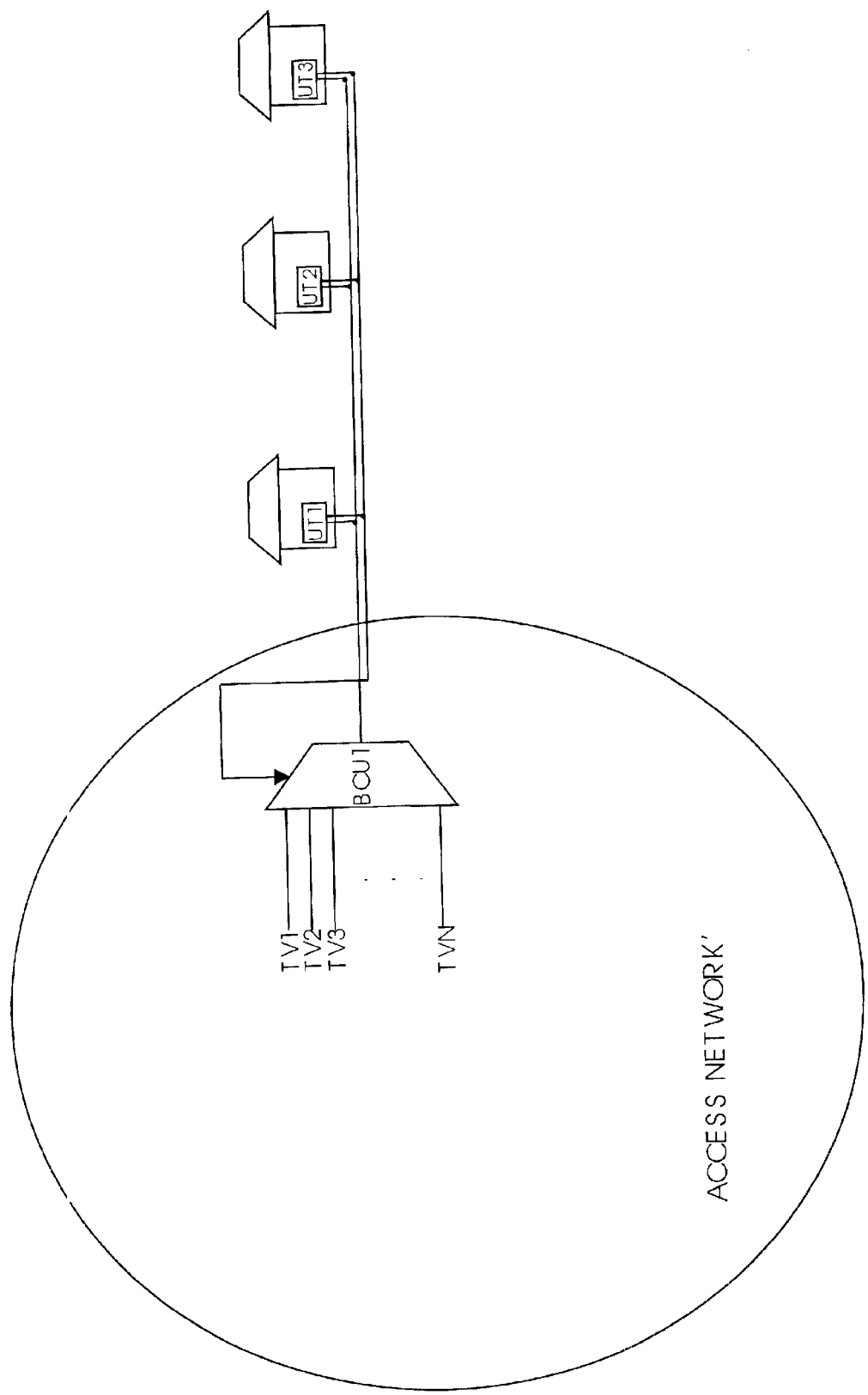
FIG. 1 illustrates the architecture of an embodiment of the known access network ACCESS NETWORK' wherein interactive distributive services are broadcasted.

The known access network ACCESS NETWORK' drawn in FIG. 1 contains several broadcasting units similar to the broadcasting unit BCU1 that is drawn. To each of these broadcasting units N television channels TV1, TV2, TV3, . . . , TVN are supplied and each of the broadcasting units serves a number of user terminals. The broadcasting unit BCU1 for example is bi-directionally coupled to the user terminals UT1, UT2 and UT3 to be able to broadcast television channels thereto via a downlink and to receive channel request information therefrom via an uplink.

In the access network ACCESS NETWORK' of FIG. 1, N television channels TV1, TV2, TV3, . . . , TVN can be selected by each subscriber. When selecting a television channel, the user terminal UT1, UT2 or UT3 of the subscriber sends request information indicative for the selected television channel via the uplink to the broadcasting unit BCU1 that serves this user terminal UT1, UT2 or UT3. For upstream transmission of the channel request information, the user terminal UT1, UT2 or UT3 uses a standard zapping protocol, like for example the ISO DSM-CC channel change protocol. The broadcasting unit BCU1 is able to interpret this standard zapping protocol, and upon receipt of the channel request information selects the requested television channel amongst the N channels TV1, TV2, TV3, . . . , TVN supplied to its input and broadcasts this television channel over the downlink towards the user terminals UT1, UT2 and UT3 served by this broadcasting unit BCU1. This downlink typically has a limited capacity so that the broadcasting unit BCU cannot permanently broadcast all television channels TV1, TV2, TV3, . . . , TVN towards the user terminals UT1, UT2 and UT3.

The just described working of the known interactive television channel distribution system requires that all television channels TV1, TV2, TV3, . . . , TVN that can be selected by the subscribers are permanently supplied to inputs of all broadcasting units in the access network ACCESS NETWORK'. To offer each subscriber the choice over N television channels TV1, TV2, TV3, . . . , TVN the links towards each broadcasting unit need at least the capacity to transfer these N television channels. In case some links in the known access network ACCESS NETWORK' do not permanently have this capacity, the limited transport capacity of the links towards the broadcasting units puts constraints on the number of television channels that can be selected by the subscribers.

Figure 2:
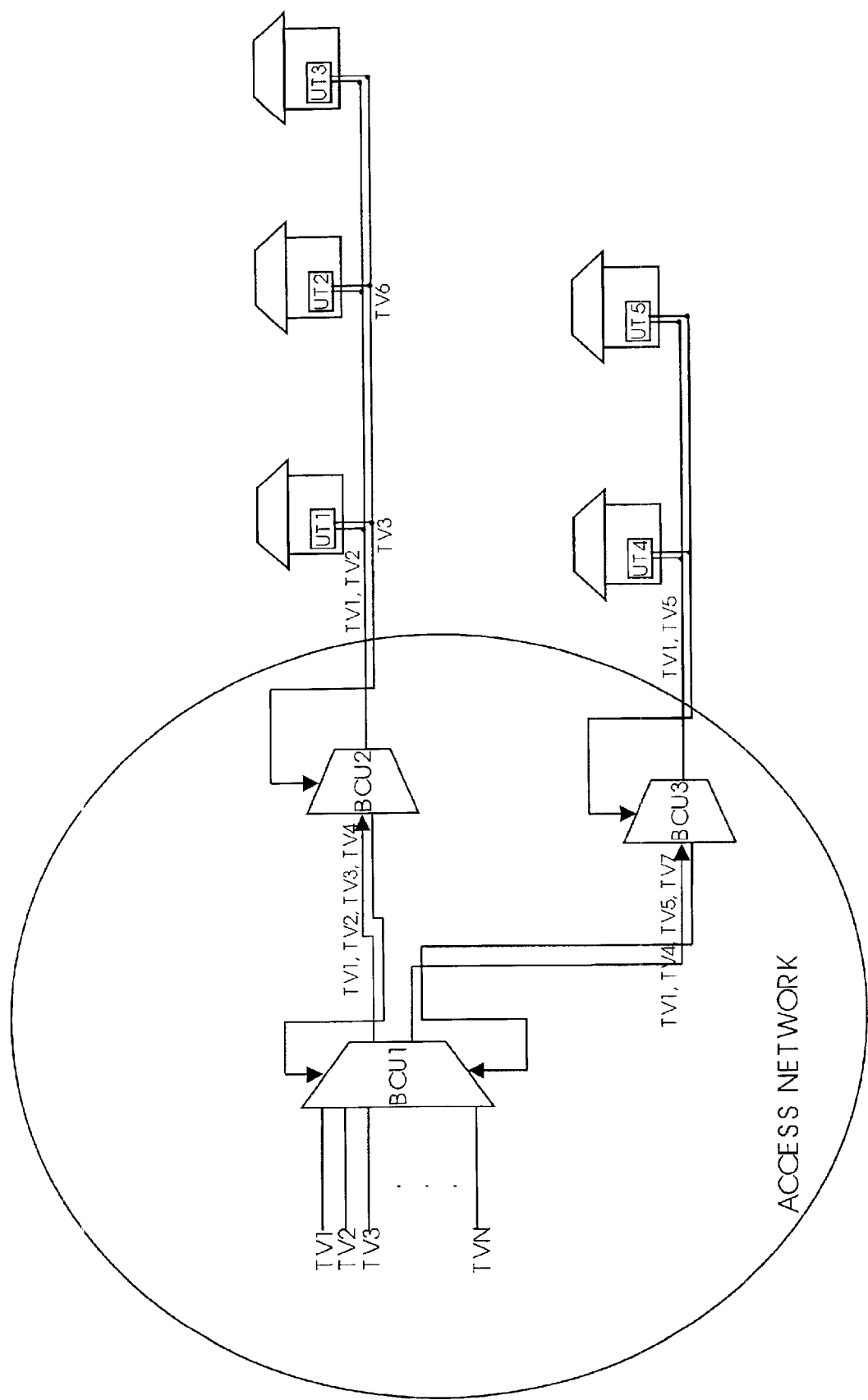
FIG. 2 illustrates the architecture of an embodiment of the access network ACCESS NETWORK according to the present invention wherein interactive distributive services are broadcasted.

The access network ACCESS NETWORK drawn in FIG. 2 contains a central broadcasting unit BCU1, broadcasting units BCU2 and BCU3 located close to the subscribers, and user terminals UT1, UT2, UT3, UT4 and UT5. To an input of the central broadcasting unit BCU1, the N television channels TV1, TV2, TV3, . . . , TVN are supplied and this central broadcasting unit BCU1 is coupled bi-directionally to the broadcasting units BCU2 and BCU3 via up- and downlinks. The downlinks between the central broadcasting unit BCU1 and the broadcasting units BCU2 and BCU3 have a limited capacity. These links are supposed to be able to carry at most four television channels. In the drawing FIG. 2, the central broadcasting unit BCU1 supplies the television channels TV1, TV2, TV3 and TV4 to the broadcasting unit BCU2, and supplies the television, channels TV1, TV4, TV5 and TV7 to the broadcasting unit BCU3. The broadcasting unit BCU2 is bi-directionally coupled to the user terminals UT1, UT2 and UT3 whereas the broadcasting unit BCU3 is bi-directionally coupled to the user terminals UT4 and UT5. These bi-directional couplings in the access network ACCESS NETWORK drawn in FIG. 2 are realised through separate up- and downlinks but it is evident that this is not necessary for implementation of the present invention. The downlinks towards the user terminals UT1, UT2, UT3 UT4 and UT5 are supposed to have a capacity of at most three television channels. At the moment considered in FIG. 2, the broadcasting unit BCU2 downstream broadcasts television channels TV1 and TV2 towards the user terminals UT1, UT2 and UT3, and broadcasting unit BCU3 is supposed to broadcast television channels TV1 and TV5 towards the user terminals UT4 and UT5. Via the uplink towards the broadcasting unit BCU2, user terminal UT1 requests television channel TV3 and user terminal UT2 request television channel TV6.

Figure 3:
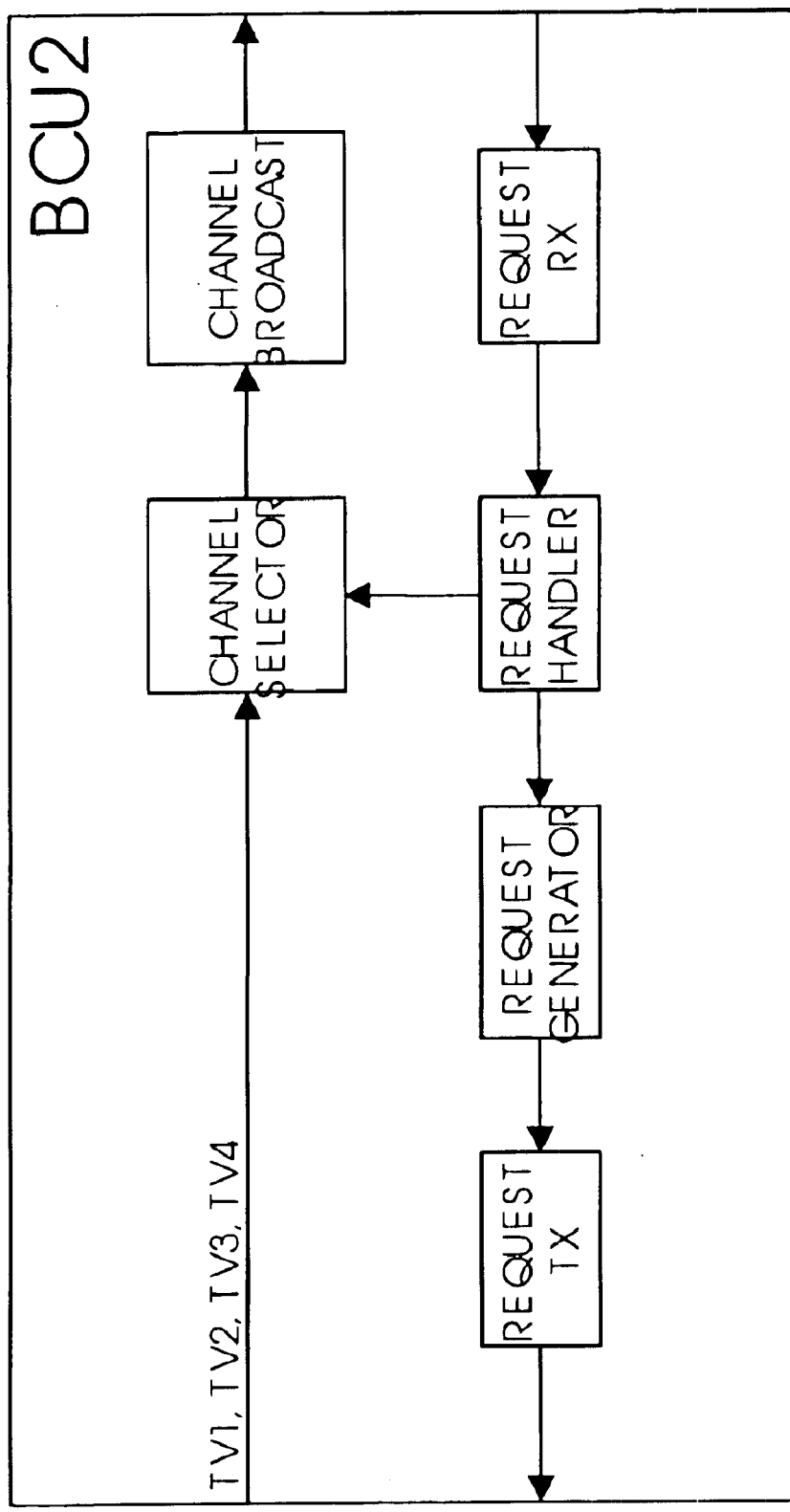
FIG. 3 is a functional block scheme of an embodiment of the broadcasting unit BCU2 according to the present invention.

To explain the working of the broadcasting units BCU2 and BCU3 in accordance with the present invention, the functional components of broadcasting unit BCU2 are drawn in FIG. 3. Between an input terminal whereto the downlink from the central broadcasting unit BCU1 is connected and an output terminal whereto the downlink towards the user terminals UT1, UT2 and UT3 is connected, the broadcasting unit BCU2 includes the cascade coupling of a channel selector CHANNEL SELECTOR and a channel broadcasting unit CHANNEL BROADCAST. Between an input terminal whereto the uplink from the user terminals UT1, UT2 and UT3 is connected and an output terminal whereto the uplink towards the central broadcasting unit BCU1 is connected, the broadcasting unit BCU2 contains the cascade coupling of a channel request receiver REQUEST RX, a channel request handler REQUEST HANDLER, a channel request generator REQUEST GENERATOR and a channel request transmitter REQUEST TX. The channel request handler REQUEST HANDLER is coupled via an output to a control input of the channel selector CAHANNEL SELECTOR.

The channel request receiver REQUEST RX in broadcasting unit BCU2 receives the request from user terminal UT1 for television channel TV3 and the request from user terminal UT2 for television channel TV6. This request information is supplied to the channel request handler REQUEST HANDLER which detects that the requested television channel TV3 is available at its input and therefor controls the channel selector CHANNEL SELECTOR to select television channel TV3 in addition to television channels TV1 and TV2 for broadcast towards the user terminals UT1, UT2 and UT3. The channel broadcasting unit CHANNEL BROADCAST consequently broadcasts television channels TV1, TV2 and TV3 over the downlink towards the user terminals UT1, UT2 and UT3. The channel request handler REQUEST HANDLER further detects that the requested television channel TV6 is not available at the input of broadcasting unit BCU2 and therefor instructs the channel request generator REQUEST GENERATOR to ask the central broadcasting unit BCU1 to supply television channel TV6 to the broadcasting unit BCU2. The channel request generator REQUEST GENERATOR in accordance with the ISO DSM-CC channel change protocol generates request information indicating that the broadcasting unit BCU2 wishes to receive television channel TV6 at its input and this request information is transmitted by the channel request transmitter REQUEST TX over the uplink towards the central broadcasting unit BCU1. In the central broadcasting unit BCU1, the request from the broadcasting unit BCU2 is interpreted and instead of the television channels TV1, TV2, TV3 and TV4, the central broadcasting unit BCU1 transfers the television channels TV1, TV2, TV3 and TV6 via the downlink between the central broadcasting unit BCU1 and broadcasting unit BCU2 towards the latter broadcasting unit BCU2. As soon as the broadcasting unit BCU2 receives the requested television channel TV6 at its input, the channel request handler REQUEST HANDLER instructs the channel selector CHANNEL SELECTOR to select television channel TV6 instead of television channel TV1, so that the channel broadcasting unit CHANNEL BROADCAST now broadcasts television channels TV6, TV2 and TV3 towards the user terminals UT1, UT2 and UT3 thus fulfilling the wishes of all subscribers.

It is noticed that since in the access network ACCESS NETWORK of FIG. 2 the same zapping protocol is used for the transmission of requests from the broadcasting unit BCU2 to the central broadcasting unit BCU1 as is used in the access network ACCESS NETWORK' of FIG. 1 for the transfer of requests from the user terminals UT1, UT2 and UT3 to the broadcasting unit BCU1, the central broadcasting unit BCU1 in FIG. 2 can be realised by the broadcasting unit BCU1 of FIG. 1. Existing broadcasting units in other words can be reused when implementing the present invention. Evidently, this may reduce the time to market of the present invention.

Although a standard zapping protocol like the ISO DSM-CC channel change protocol is used in the above described embodiment of the invention for communication between the user terminals UT1, UT2, UT3, UT4, UT5 and the broadcasting units BCU2 and BCU3 on the one hand, and for communication between the broadcasting units BCU2 and BCU3 and the central broadcasting unit BCU1 on the other hand, it should be remarked that the applicability of the present invention does not require the use of any particular protocol for transfer of the channel request information. In case the central broadcasting unit BCU1 is a broadband switch node, it is advantageous to use for the channel requests sent from the broadcasting units BCU2 and BCU3 towards the central broadcasting unit BCU1 a standard signalling protocol, like for instance the ITU-T Q.2931 protocol or the ATM Forum 3.1 or 4.0 signalling. This is so because existing broadband switch nodes are able to interpret these standard signalling protocols so that the central broadcasting unit BCU1 can be realised by an existing broadband switch thus allowing fast deployment of the present invention, even in existing access networks.

Yet another remark is that the applicability of the invention is not reduced to telecommunication systems with a particular physical transmission medium or wherein any particular physical layer transmission protocol is used. The invention in other words can be applied in any access system, irrespective of the fact whether the distributive services are provided over twisted pair cables, coaxial cables, optical fibres, radio links, satellite links, or the like, and irrespective of the physical layer protocol (e.g. ADSL—Asymmetric Digital Subscriber Line) that is used to represent the bits on the transmission link.

It is also noticed that although the above described embodiment of the invention contains a two-level hierarchy of broadcasting units, applicability of the present invention is extendable to any access network wherein broadcasting units are arranged in a hierarchy with more than two levels.

Furthermore, it is remarked that an embodiment of the present invention is described above in terms of functional blocks. From the functional description of these blocks it will be obvious for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention.

What is claimed is:

1. A broadcasting unit for broadcasting, in an access network, channels of a distributive interactive service to a plurality of user terminals, said broadcasting unit comprising:
   channel selecting means for selecting, from among available channels at an input of said broadcasting unit, said channels to be broadcasted;
   channel broadcasting means, coupled to said channel selecting means, for broadcasting said channels to said user terminals;
   request receiving means for receiving, from one of said user terminals, first type request information indicative of at least one requested channel;
   request handling means, coupled between said request receiving means and a control input of said channel selecting means, for interpreting said first type request information controlling said channel selecting means to select said at least one requested channel,
   said request handling means also checking whether said at least one requested channel is available at said input of said broadcasting unit;
   request generating means, coupled to said request handling means, for generating second type request information indicative for said unavailable requested channel, when said at least one requested channel is not available at said input of said broadcasting unit; and
   request transmitting means, coupled to said request generating means, for transmitting said second type request information to another broadcasting unit.

2. The broadcasting unit according to claim 1, wherein said request generating means is adapted to generate said second type request information in accordance with a standard zapping protocol already used for said first type request information.

3. Broadcasting unit according to claim 1,
   wherein said request generating means is adapted to generate said second type request information in accordance with a standard signaling protocol.

4. Access network enabled to broadcast channels of a distributive interactive service to a plurality of user terminals, said access network comprising a plurality of broadcasting units as defined by claim 1 organized in a multi-level topology.

5. Access network enabled to broadcast channels of a distributive interactive service to a plurality of user terminals comprising:

first broadcasting unit supplied with a plurality of television channels; and second broadcasting unit located closer to a plurality user terminals and is supplied at an input with a limited selection of channels chosen from said plurality of television channel, wherein said user terminal generates a first type of requests received by said second broadcasting unit, wherein said second broadcasting unit processes said first type of requests by broadcasting channels in said limited selection of channels and sending a second type requests to said first broadcasting unit for channels not within said limited selection of channels.

6. The Access Network according to claim 5, wherein said limited selection of channels is modified based on said first type requests from said user terminals.

7. The Access Network according to claim 5, further comprising a plurality of said second broadcasting unit coupled to said first broadcasting unit.

8. The Access Network according to claim 5, wherein said broadcasting unit comprises:

a channel selector to select a channel from said limited selection of channels;

a request receiver to receive said first type of requests from said user terminals;

a request handler coupled to said request receiver and said channel selector to process said first type of requests;

a request generator coupled to said request handler to generate said second type of requests to said first broadcasting unit; and a request transmitter coupled to said request generator for sending said second type of requests to said first broadcasting unit, wherein based on said second type of requests said limited selection of channels is modified.

* * * * *